March 13, 1973   F. J. KRIZ   3,720,804

THREE-D ELECTRODE MACHINING TOOL

Original Filed June 18, 1970   5 Sheets-Sheet 1

INVENTOR
FERDINAND J. KRIZ

BY Smythe & Moore

ATTORNEYS

March 13, 1973 F. J. KRIZ 3,720,804
THREE-D ELECTRODE MACHINING TOOL
Original Filed June 18, 1970 5 Sheets-Sheet 2

INVENTOR
FERDINAND J. KRIZ
BY
Smythe & Moore
ATTORNEYS

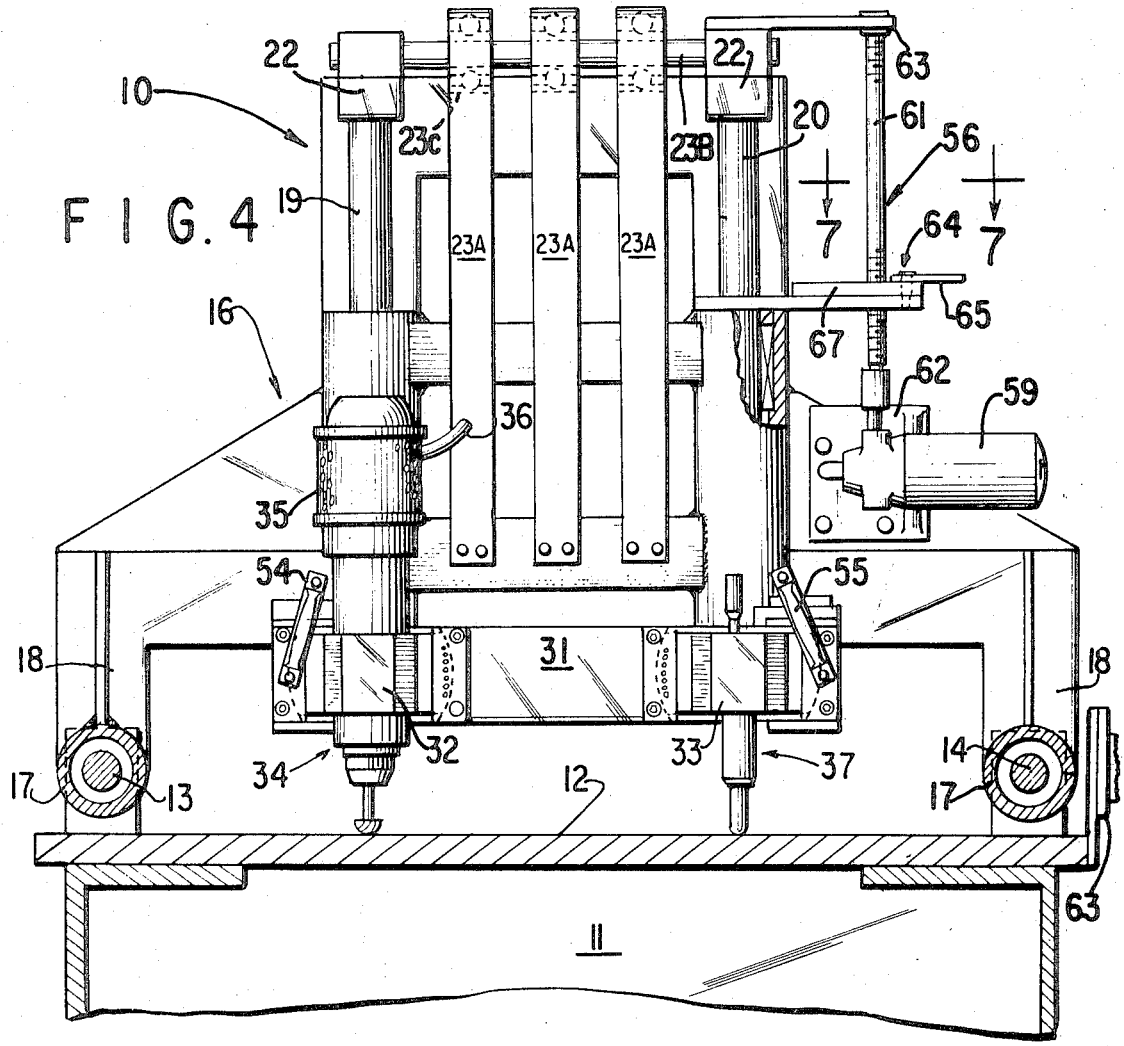
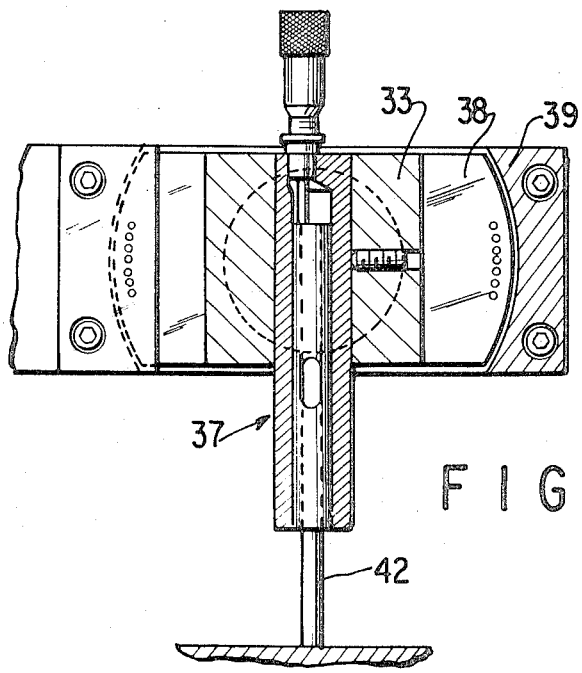

March 13, 1973 F. J. KRIZ 3,720,804
THREE-D ELECTRODE MACHINING TOOL
Original Filed June 18, 1970 5 Sheets-Sheet 4

INVENTOR
FERDINAND J. KRIZ
BY
Smythe & Moore
ATTORNEYS

FIG. 10
FIG. 8
FIG. 9
FIG. 11
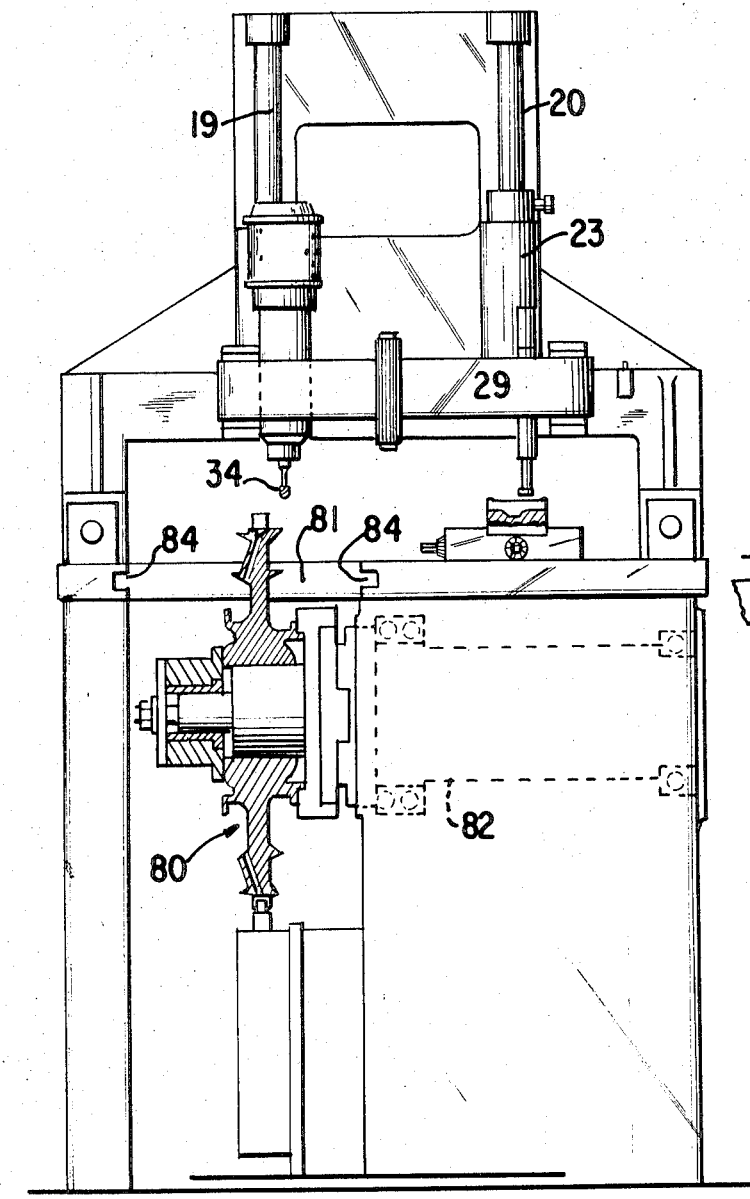
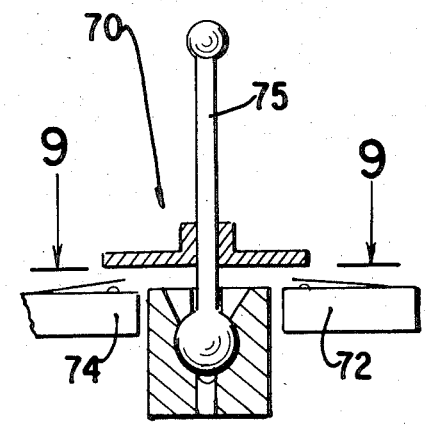
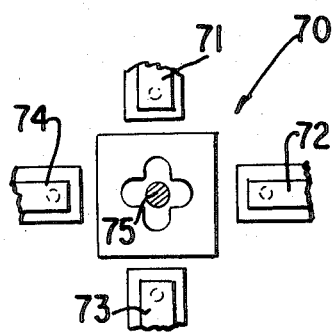
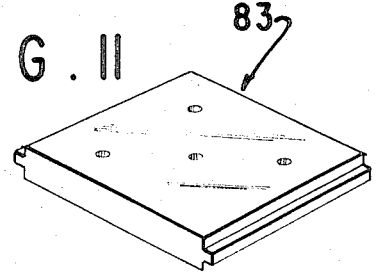

United States Patent Office 3,720,804
Patented Mar. 13, 1973

3,720,804
THREE-D ELECTRODE MACHINING TOOL
Ferdinand J. Kriz, Fairfield, Conn., assignor to The Producto Machine Company, Bridgeport, Conn.
Continuation of abandoned application Ser. No. 47,280, June 18, 1970. This application Dec. 23, 1971, Ser. No. 211,745
Int. Cl. B23k 9/16
U.S. Cl. 219—69 V     10 Claims

ABSTRACT OF THE DISCLOSURE

A contour-following apparatus has a first frame which is movable horizontally, a second frame movable vertically on the first frame, and a third frame attached to the second frame and pivotally movable in a horizontal plane. A tracer and a cutter are mounted on the third frame with each being individually pivotably adjustable.

---

Figure 1:
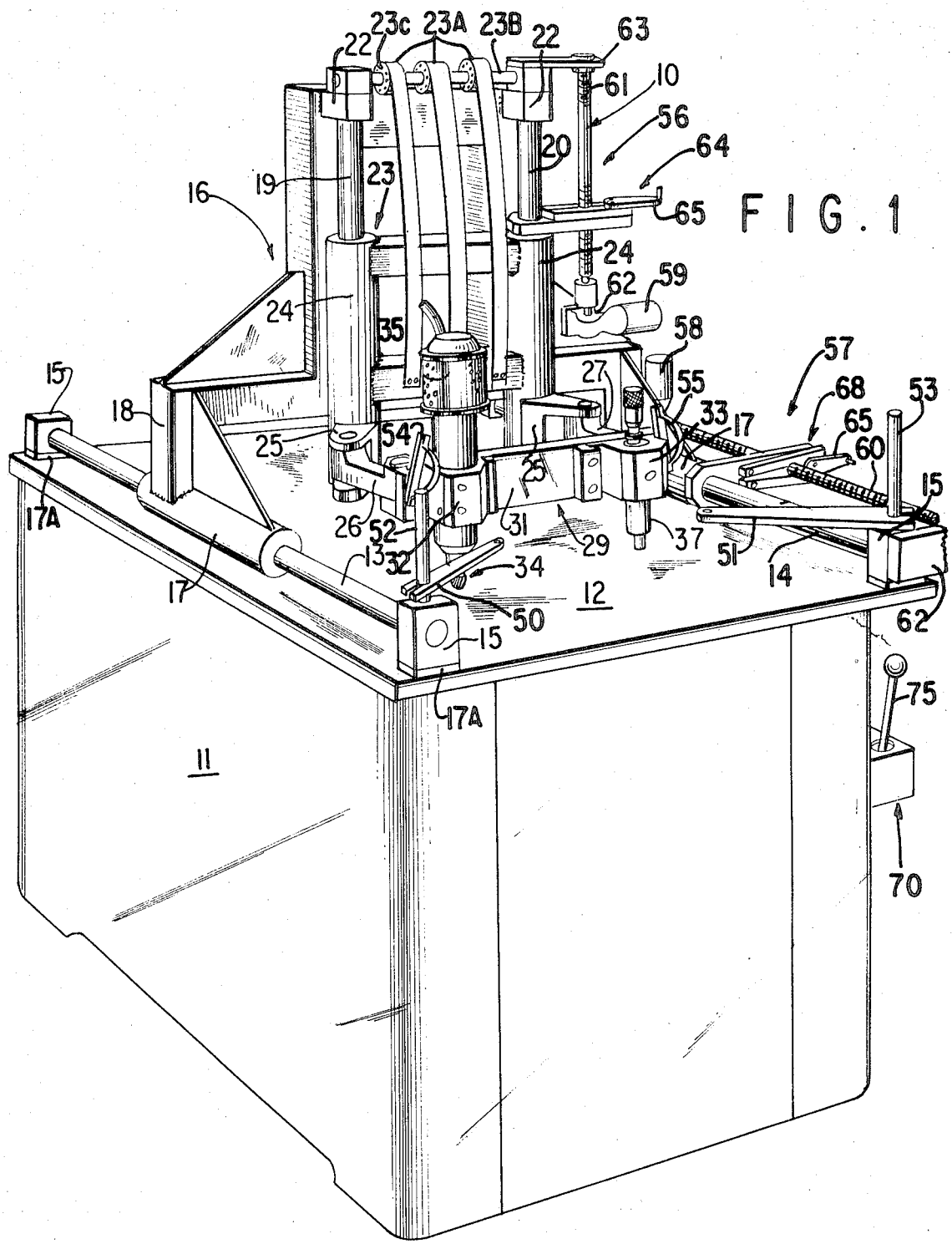

This is a continuation of application Ser. No. 47,280, filed June 18, 1970, now abandoned.

The present invention relates to a contour-following apparatus for a machine tool having a plurality of components movable vertically and horizontally to enable a tracer to accurately follow a pattern or form.

Many forms of contour-following devices for machine tools have been devised wherein a tracer or stylus follows a pattern and the movement of the tracer is duplicated by a cutting tool. The cutting tool engages a workpiece so that the path of the cutting tool is a duplication of the path of the tracer, and the finished workpiece is a duplicate of the pattern. For relatively simple forms of patterns it is desirable that the contour-following apparatus be operated manually as opposed to various forms of automatic electrohydraulic contour devices. The operator moves a component of the device to maintain the tracer in contact with a pattern and the movement of the tracer is duplicated by the cutter. Such a manually-operated device must be capable of universal movement in all directions with a minimum of effort on the part of the operator. Previous devices have been essentially based upon various forms of pantograph arrangements. Such arrangements have not been completely satisfactory since they have lacked flexibility. Also, most arrangements are 2:1 or greater reduction and not 1:1 as is possible herein.

One of the objects of the present invention is to provide an improved contour-following apparatus for a machine tool and the like.

Another of the objects of the present invention is to provide a contour-following apparatus having several components which are individually movable vertically and horizontally to enable a tracer to accurately follow a pattern.

Another of the objects of the present invention is to simplify the design, structure and operation of three-dimentional equipment for machining electrodes for electrical discharge machines. The basic design allows expanding to larger sizes.

Still another object is to enable the copying of 1:1 electrodes from a master, an actual piece-part or an existing die cavity or mandrel.

According to one aspect of the present invention, a contour-following apparatus may comprise a base upon which a workpiece and a pattern may be supported. A first frame is slidably mounted on the base so as to be movable in a horizontal plane. A second is slidably mounted on the first frame for vertical movement thereon. A third frame is pivotally connected to the second frame by a pair of similar arms whose ends are respectively pivotally connected to the second and third frames, the third frame being movable in a horizontal plane. A tracer and a cutter are mounted on the third frame and are horizontally spaced from each other to engage operatively the pattern and workpiece, respectively. The tracer and cutter are also pivotally movable in a vertical plane.

The first frame is slidably mounted by means of frictionless bearings on a pair of spaced parallel rods mounted on the supporting surface of the base with the pattern and workpiece being between the rods. The second frame is similarly mounted on a pair of spaced vertical rods mounted on the first frame.

In a further aspect, power means can be used to move in a selected direction. Also, the power means can be used to move either frame in both directions at selected variable speeds with independent horizontal and vertical movement.

Copying of a sphere is possible with the present invention so that three-dimensional configurations suitable for electrical discharge machining techniques can theoretically be copied. The exact three-dimensional configuration can be copied, but the invention also has the ability to select a so-called "dimensional envelope," for example, 0.001" per side smaller than the model for a finishing electrode, and as much as 0.020" per side smaller for a roughing electrode. This requirement is necessary to compensate for the electrical "spark gap" needed for electrical discharge machining. The "spark gap" is variably adjustable for intensity and length which requires that the electrode be machined correspondingly dimensionally smaller.

Interchangeable styli can be especially designed for placing in a stylus holder which has a micrometer for fine adjustment. The holder and micrometer are enclosed in an outer sleeve for approximate vertical adjustment. Styli have a ground radius tip, and styli lengths are ground from a common centerline at the radius end to a selected flat surface on the opposite end. The diameters are ground in 0.002 increments.

Other objects, advantages, and features of the present invention will be apparent from the accompanying description and drawings, which are merely exemplary.

Figures 2, 3:
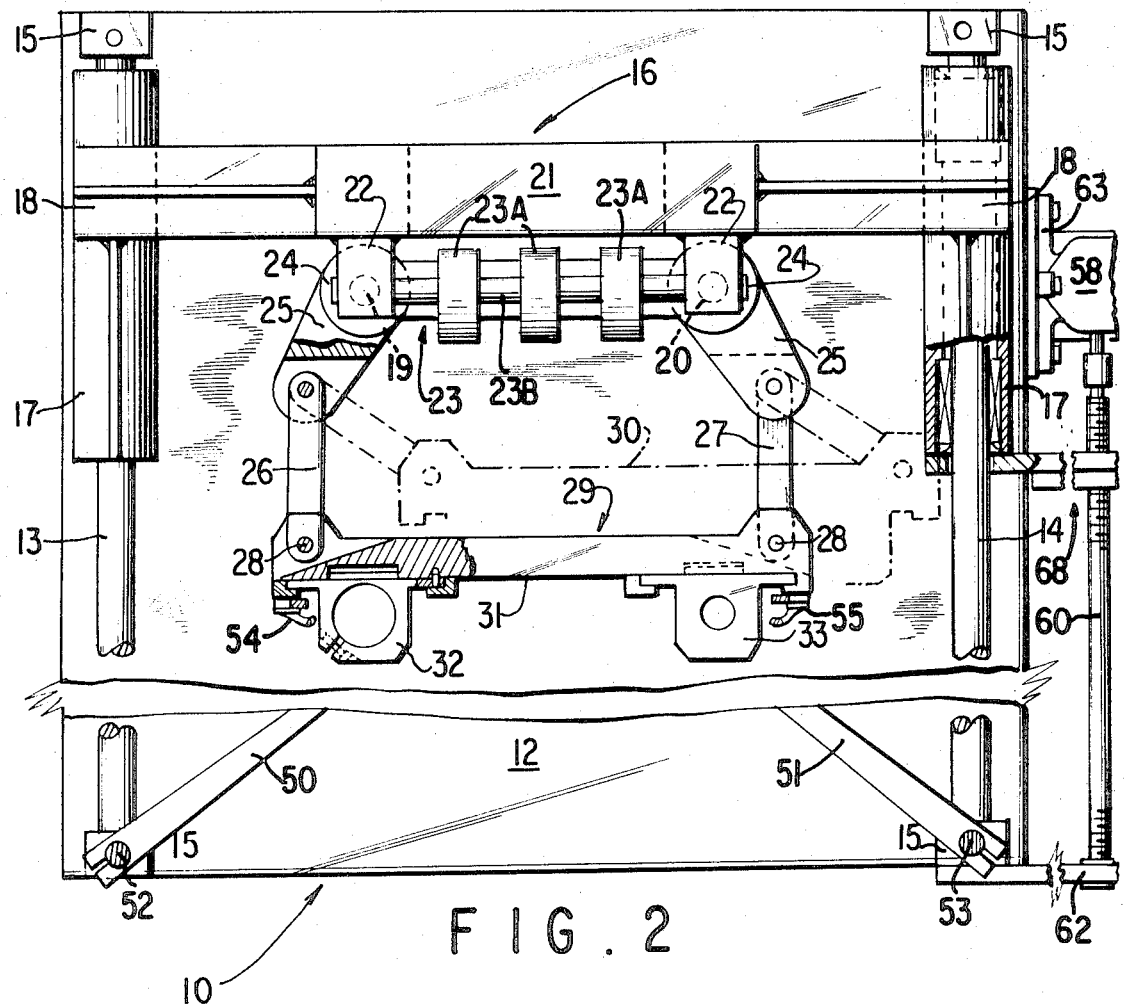
Figure 5:
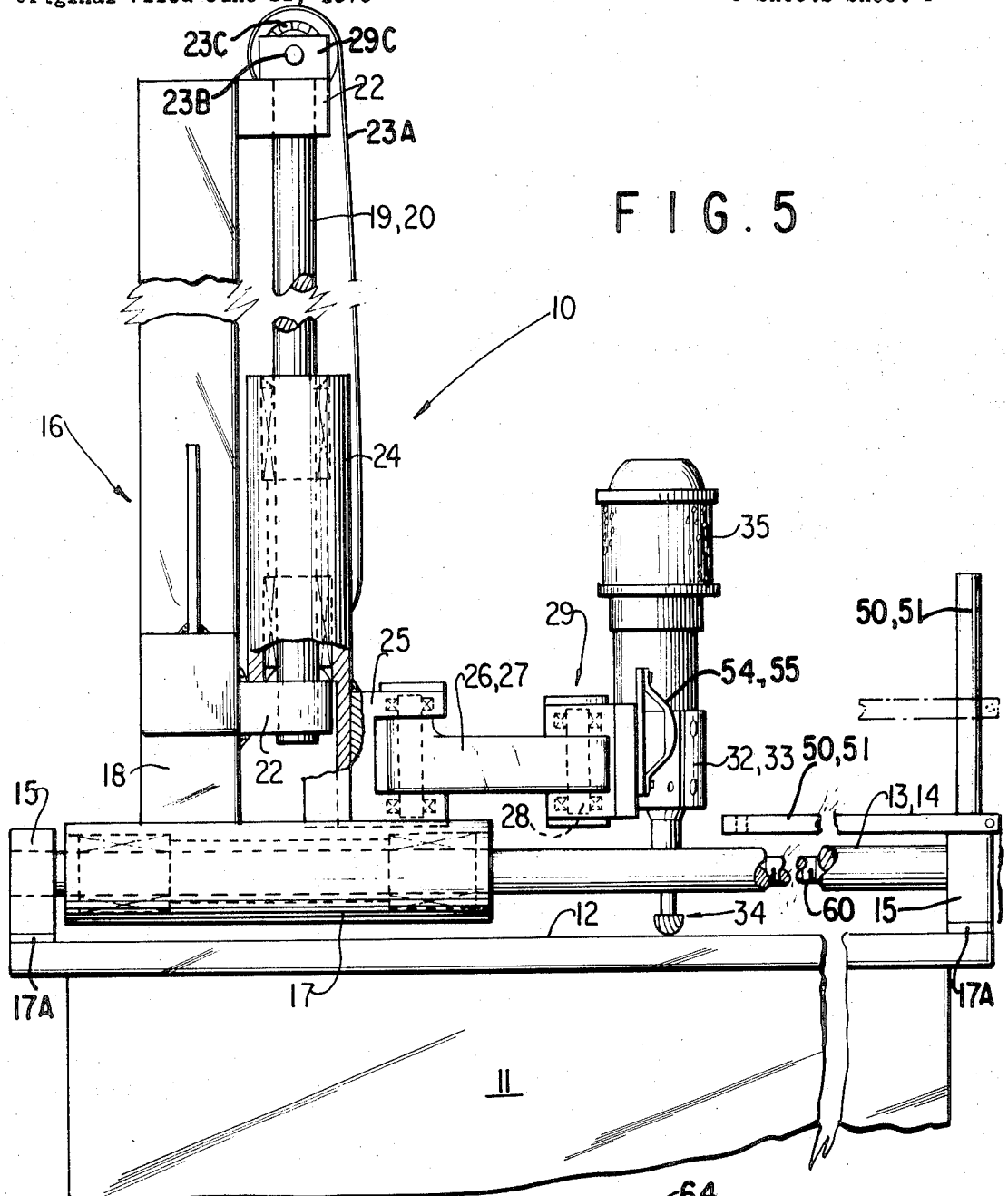
Figure 7:
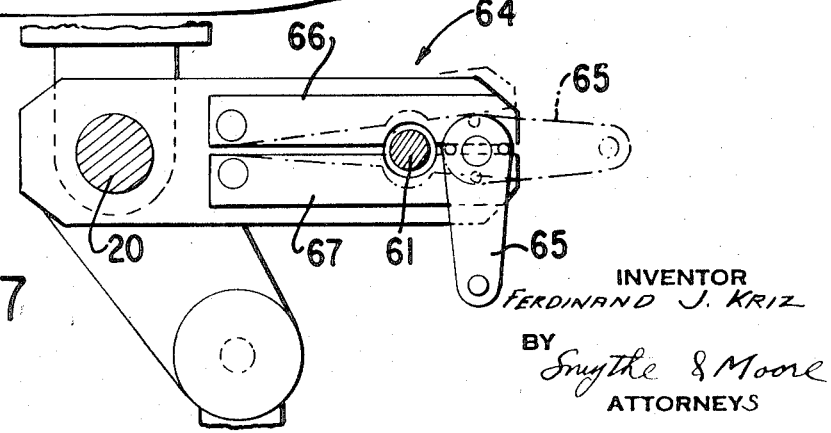

In the drawings:
FIG. 1 is an overall perspective device of the contour-following apparatus according to the present invention;
FIG. 2 is a top plan view of the device of FIG. 1;
FIG. 3 is a schematic representation showing the movements of the tracer and workpiece in three mutually perpendicular directions;
FIG. 4 is a sectional view taken along the line 4—4 of FIG. 2;
FIG. 5 is a side elevational view of the device of FIG. 1;
FIG. 6 is a partial vertical sectional view of the tracer mounting;
FIG. 7 is an enlarged fragmentary view looking in the direction 7—7 of FIG. 4;
FIG. 8 is a fragmentary view of a control;
FIG. 9 is a view looking in the direction 9—9 of FIG. 8;
FIG. 10 is a front view of another form of the machine; and
FIG. 11 is a perspective view of a table to fill in the aperture in FIG. 10.

Proceeding next to the drawings where like reference symbols indicate the same parts throughout the various views, a specific embodiment of the present invention will be described in detail.

As may be seen in FIG. 1, the contour-following apparatus of the present invention is indicated generally at 10 and comprises a base 11 having a horizontal supporting surface 12. A pair of spaced parallel rods 13 and 14 are mounted on opposite sides of the supporting surface 12 by means of vertical brackets 15.

A frame 16 has a pair of spaced linear bearing blocks 17 fastened thereto by brackets 18. If desired, height-adjusting blocks 17A can be used to double or triple workpiece capacity. Further flexibility of this design is possible by replacing adjusting blocks 17A (FIG. 1) to suit larger diameters or workpiece dimensions. It is possible to "contour machine" wheels electrode forms by locking out the horizontal traveling frame with screw 17B and following model or pattern in two planes only. Wheel rotation is provided by device 82. Wheels are usually graphite, copper graphite or "Copperdyne," a trademark of Avco for electrolytic grinding with copperdyne abrasive wheels.

The above is important for the following non-traditional machining process units such as: electro-chemical discharge grinding (ECDG)—electrical discharge grinding (EDG)—electrolytic chemical grinding (ECG). The bearing blocks 17 are provided with frictionless bearings and ride upon the rods 13 and 14. The linear motion of frame 16 upon the rods 13 and 14 provides a horizontal translation movement.

A pair of spaced vertical rods 19 and 20 are mounted on a vertical upright portion 21 of frame 16 by horizontally extending brackets 22. A vertically movable frame 23 is mounted on rods 19 and 20 by means of cylindrical bearing blocks 24 through which the rods 19 and 20 pass. The bearing blocks 24 are similarly provided with frictionless bearings to facilitate vertical movement and also with constant force springs 23A acting on the vertical frame 23 when it is moved in either direction in a vertical plane. One type of such a spring is sold under the trademark "Negator," a trademark of Ametek, Inc. The spring 23A can be mounted on rod 23B by roller bearings 23C.

From the lower ends of the bearing blocks 24, a pair of bracket arms 25 extend outwardly at an angle with a pair of similar arms 26 and 27 having their corresponding ends pivotally connected in the brackets 25. The other ends of arms 26 and 27 are pivotally connected at 28 to a third frame 29 which is capable of movement in a horizontal plane as indicated by the dash lines 30. This movement is an essentially pivotal movement and provides for linear translation in a horizontal plane. The frame 29 has a forward face 31 upon which is mounted a pair of retaining brackets 32 and 33. In the bracket 32, there is mounted a cutter assembly 34 having a driving motor 35 which may be connected to a source of electrical energy by cord 36. Assembly 37 can be adjusted vertically for approximate settings of cutter tool assembly 34. Further adjustments are possible with the inner sliding sleeve 37A retainer for the stylus. Control in decimal settings can be made with micrometer 37B.

In bracket 33, there is mounted a tracer assembly 37 which may be seen in greater detail in FIG. 6. The tracer assembly 37, shown in section in FIG. 6, is provided with arcuate supporting surfaces 38 which are seated in correspondingly shaped surfaces 39 formed in the bracket 33. The cutter assembly 34 is similarly mounted so that both the cutter and tracer are capable of pivotal movement as indicated by the dash lines 40 and 41, respectively, of FIG. 3.

The tracer assembly includes a stylus 42 having a radius which the operator uses to trace the outline of a pattern (not shown). Size control of the electrode is controlled by exchanging styli with varied radii ends. This feature is desirable as usually a pattern or model is full size. The electrode size must be dimensionally corrected for "spark gap" needed for electrical discharge machining. It will be apparent that the tracer, and correspondingly the cutter, is capable of three-dimensional movement as indicated in FIG. 3. The three-dimensional movement is provided by means of three individual components each of which are capable of translation in mutually perpendicular planes. The additional pivotal movement of both the tracer and the cutter imparts additional flexibility to the movements of the apparatus. The movement of the stylus is accurately reproduced by the cutter which shapes a workpiece in accordance with the movements of the stylus.

In order to assist in operation of the device, a pair of arm rests 50, 51 can be provided, such being vertically and rotatably adjustable on posts 52, 53. Handles 54, 55 can be placed on frame 29 for grasping by the hands.

So as to assist in movement of the frame, vertical power operator means shown generally at 56 and horizontal power operator shown generally at 57 can be incorporated in the machine. Such a movement includes motors 58, 59 driving screw-threaded rods 60, 61 which are supported in brackets 62, 63.

The vertical rod 61 is selectively connectable to frame 23 by a clamipng means 64, shown generally in FIG. 7. Movement of engagement arm 65 (FIG. 7) will permit arms 66, 67 to engage or disengage with rod 60. Arms 66, 67 have half nuts thereon to engage the screw threads of the rods.

The horizontal rod 60 is selectively engageable with the frame 16 by a similar clamping means 68.

Electrical control means or "joy stick" 70 can be used to energize either of the motors in either direction by suitable conventional switching circuits. As seen in FIGS. 8 and 9, switches 71, 72, 73, 74 are selectively closeable by stick 75.

The controls are arranged so that normally only one motor can be operated at a time and only in one direction. It is also possible to arrange the circuits so that both frame 16 and frame 23 can be power moved. By use of one drive for one selected direction and manual movement in the other, it has been found that a more precise movement of the tool can be obtained.

Another form of the invention is shown in FIG. 10 for operation on a vertically mounted workpiece such as turbine wheel 80 or an electrode in a wheel configuration. Table 12 has an opening 91 through which the wheel 80 can protrude so as to be contactable with the tool 34. The wheel or other workpiece can be held in the rotatable mandrel 82. If it is desired to use the form shown in FIG. 10 for horizontal work, the plate 83 (FIG. 11) can be put in place to cover aperture 81. Groove and tongue means 84 can be employed to hold the plate 83 in place.

It can be seen that the present invention is a contour-following apparatus having a simplified structure which is capable of accurately reproducing the movements of a tracer which comprises three components which are capable of translation movement in mutually perpendicular directions.

It will be understood that various details of construction and arrangements of parts may be made without departing from the spirit of the invention.

What is claimed is:

1. A contour-following apparatus for a machine tool comprising a base for supporting a workpiece and a pattern thereon, a first frame slidably mounted on said base and movable in a horizontal plane, a second unitary frame slidably mounted on said first frame for vertical movement only thereon, a third frame having a pair of spaced similar arms pivotally connected thereto and to said second frame with said third frame being movable transversely only in a horizontal plane relative to said second frame, said third frame and said arms being movable in a parallelogram relation relative to said second unitary frame, a stylus and a cutter mounted on said third frame and horizontally spaced from each other to engage operatively said pattern and workpiece respectively.

2. A contour-following apparatus as claimed in claim 1 including a pair of spaced parallel rods mounted horizontally on the supporting surface of said base with said pattern and workpiece being positioned therebetween, said first frame being slidably mounted on said supporting rods.

3. A contour-following apparatus as claimed in claim 2 wherein said first frame has frictionless bearings to engage said spaced rods.

4. A contour-following apparatus as claimed in claim 1 and comprisinug a pair of spaced parallel rods mounted vertically on said first frame, said second frame slidably mounted on said vertical rods.

5. A contour-following apparatus as claimed in claim 4 and comprising means between said first and second frames for maintaining a constant force on said second frame to facilitate the vertical movement in either direction thereof.

6. A contour-following apparatus as claimed in claim 5 wherein said means comprises constant force spring means.

7. A contour-following apparatus as claimed in claim 1 wherein said tracer and cutter are pivotally mounted for pivotal movement in a vertical plane.

8. A contour-following apparatus as claimed in claim 1 wherein there is a power drive selectively connectable to at least one of said first and second frames.

9. A contour-following apparatus as claimed in claim 8 wherein the power drive includes a rotatable screw-threaded shaft and a selectively clampable nut for engagement with said shaft.

10. A contour-following apparatus as claimed in claim 1 wherein the base has an aperture therein through which workpieces can protrude, so as to be engageable by said cutter.

References Cited

UNITED STATES PATENTS

| | | | |
|---|---|---|---|
| 1,489,153 | 4/1924 | Robinoff | 228—32 |
| 1,515,485 | 11/1924 | Hope | 33—24 R |
| 1,949,251 | 2/1934 | Gilbert | 219—8 |
| 2,807,878 | 10/1957 | Woods | 33—24 R |
| 3,408,475 | 10/1968 | Fier | 219—125 PL |
| 3,443,732 | 5/1969 | Wall, Jr. et al. | 228—7 |
| 2,678,496 | 5/1954 | Martin | 33—23 H |
| 2,726,615 | 12/1955 | Downing | 33—23 HX |

C. L. ALBRITTON, Primary Examiner

G. R. PETERSON, Assistant Examiner

U.S. Cl. X.R.

33—23 H, 24 R; 51—100 R